United States Patent
Webb et al.

[19]

[11] Patent Number: 6,151,018
[45] Date of Patent: Nov. 21, 2000

[54] VIDEO PICTURE IMPROVING APPARATUS AND METHOD

[75] Inventors: Robert I. Webb, Lebanon, N.J.; David Bergeron, Londonderry, N.H.; Christopher J. Daly, San Diego, Calif.

[73] Assignee: NuWave Technologies, Inc., Fairfield, N.J.

[21] Appl. No.: 09/040,232

[22] Filed: Mar. 14, 1998

[51] Int. Cl.[7] ...................................................... H04N 7/16
[52] U.S. Cl. ........................... 345/327; 348/10; 455/3.2; 455/6.2
[58] Field of Search .................................. 348/10, 11, 6, 348/7, 12, 13, 460, 461, 473, 474, 673, 687, 693, 625, 627, 628, 607, 663, 665, 679; 455/3.2, 6.2, 6.3; 345/327

[56] References Cited

U.S. PATENT DOCUMENTS

| | | | |
|---|---|---|---|
| 3,914,545 | 10/1975 | Engel | 348/679 |
| 4,298,885 | 11/1981 | Okada | 348/679 |
| 5,299,004 | 3/1994 | Joo et al. | 348/614 |
| 5,321,512 | 6/1994 | Huang | 348/607 |
| 5,389,975 | 2/1995 | Maeshima et al. | 348/556 |
| 5,654,774 | 8/1997 | Pugel et al. | 348/725 |
| 5,828,422 | 10/1998 | Gaudreau | 348/614 |

Primary Examiner—Chris Grant
Attorney, Agent, or Firm—Steven J. Adamson

[57] ABSTRACT

An apparatus, method and system for improving or otherwise affecting the picture produced from a video signal. The apparatus preferably includes a video signal receiver, a circuit that decodes picture parameter correction information from a received video signal, and a circuit that processes a received video signal based on decoded picture parameter correction information. The correction information is preferably located in the vertical blanking interval of the received video signal. The method includes encoding picture parameter correction information into a vertical blanking interval of a video signal.

23 Claims, 4 Drawing Sheets

VIDEO PICTURE IMPROVING APPARATUS AND METHOD

CROSS REFERENCE TO RELATED APPLICATIONS

This application is related to U.S. Patent Application entitled, Satelite Broadcast Video Picture Improving Apparatus and Method, Ser. No. 09/040,233, filed Mar. 14, 1998. The present application and the related application are commonly assigned. The related application is hereby incorporated by reference as though it was included herein.

FIELD OF THE INVENTION

The present invention relates to video signal processing and, more specifically, to improving or otherwise affecting a picture generated from a video signal.

BACKGROUND OF THE INVENTION

Several systems exist for transmitting a video signal to a television or other type of monitor. These systems include satellite transmission systems, cable transmission networks and video cassette (VCR) and video disk (DVD) players, amongst others. Picture quality depends on the quality of the initial source signal, the transmission media and the ability of the monitor to faithfully reproduce the input signal. Many prior art monitors include a mechanism that provides a viewer with at least some type of manual adjustment of these picture parameters, either by remote control or by tuning a knob provided about the monitor.

One reason for adjustable picture parameters is that the preferred parameter settings for a particular "scene" may differ depending on the nature of the scene. For example, the scene of a particular picture may be inside or outside, daytime or nighttime, close-in or far away, and the ideal picture parameter settings may differ for each of these scenes.

Some prior art video image display systems have attempted to create general scene "categories" such as sports, movie or drama. These categories, however, are overly broad. For example, a football game may be played outside during the day, outside at night under lights, inside a dome stadium, or outside in a game that starts during the day and ends during the night. The projected picture would be improved by having more than one setting within the sports category to accommodate these different scenes. In a program, however, where the scenes change rapidly, the viewer's picture correction attempts could not keep up with the program's changing scenes. Hence, a need exists to provide picture parameter correction values for scenes within a program or for a program as a whole.

In addition, the FCC regulates the voltage range of video signal components such as the luminance and chrominance components, thereby limiting dynamic range. A need exists to extend the dynamic range of these and/or related components to improve or otherwise affect a picture.

SUMMARY OF THE INVENTION

Accordingly, it is an object of the present invention to improve of otherwise affect a picture produced from a video signal.

It is another object of the present invention to achieve such improvement or other effect by propagating picture parameter correction or modification information along with a video signal and by processing picture parameter correction or modification information so as to improve or otherwise affect a video signal.

It is another object of the present invention to provide picture parameter correction information for program scenes.

It is another object of the present invention to transmit the picture parameter information in the blanking interval of the video signal and to receive and process it therefrom.

And it is also an object of the present invention to process picture parameter correction information for such parameters as clarity, noise reduction, intensity, black level, and color, and the like.

These and related objects of the present invention are achieved by use of a video picture improving apparatus and method as described herein.

The attainment of the foregoing and related advantages and features of the invention should be more readily apparent to those skilled in the art, after review of the following more detailed description of the invention taken together with the drawings.

DETAILED DESCRIPTION

Figure 1:
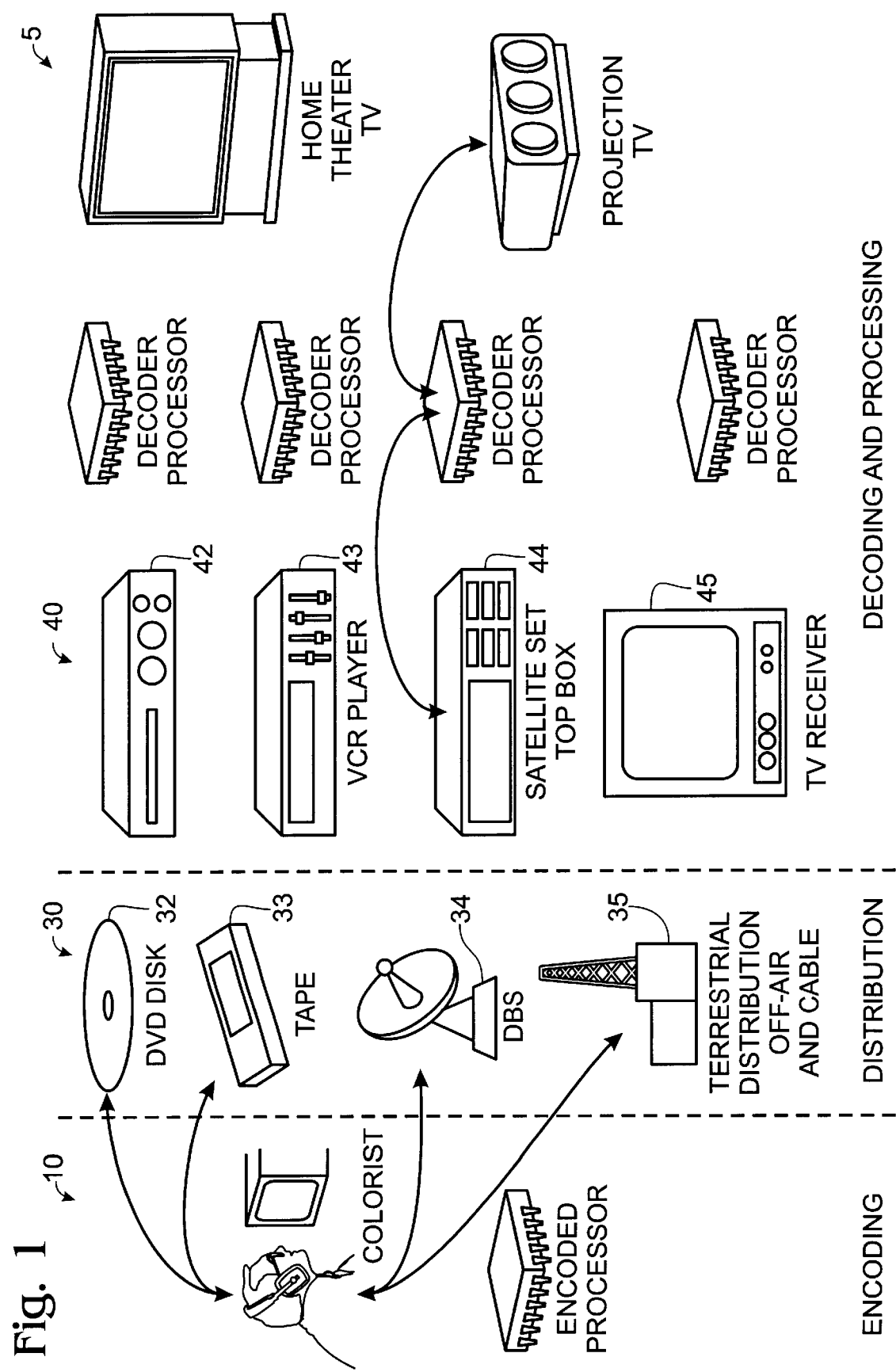
FIG. 1 is an overview of a video signal processing system in accordance with the present invention.

Referring to FIG. 1, an overview of a video signal processing system 5 in accordance with the present invention is shown. As described in more detail below, system 5 includes circuitry/logic 10,30,40 that respectively inserts encoded picture improvement information into a video signal, that distributes the video signal and that processes the video signal (including decoding the picture improvement information) for display. In the encoding circuit/logic, a person known in the art as a "colorist" (using appropriate equipment therefor as described with reference to FIGS. 2–3) and as otherwise known in the art encodes picture parameter settings for each "scene" from an initial video signal. The video signal with picture parameter codes therein is distributed by way of conventional distribution techniques including DVD 32, cassette tape 33, satellite transmission 34 and terrestrial transmission (off-air, cable, Internet TV, etc.). Processing logic 40 is provided within (or in communication with) a video signal receiver that corresponds to the applicable distribution (i.e., transmission) technique. The corresponding receivers for the distribution techniques shown in FIG. 1 respectively include a DVD player 42, a video cassette player 43, a satellite set top box (STB) 44 and a cable ready television receiver 45, amongst others.

Upon receipt at processing logic 40, the video signal undergoes conventional processing and, in addition, picture parameter information is decoded and applied to the received video signal in such a manner as to improve (e.g., increase dynamic range or clarity, etc.) or otherwise affect the picture generated therefrom. As described in more detail below (with reference to FIG. 4), picture parameter information is preferably transmitted in the vertical blanking interval in a manner analogous to the transmission of closed caption information. The improved or otherwise affected video signal is then output for display on any suitable display mechanism such as a home theater television 96, a projection television system 97 or a conventional television monitor 98.

In a preferred embodiment, the picture parameters that are used for picture improvement are clarity, noise reduction, intensity, color and black level. While these parameters are preferred, it should be recognized that the use of less than all of these parameters or the inclusion of other related parameters is within the scope of the present invention. In addition, while it is preferred to encode picture parameters for each scene, the parameter settings may be changed at any interval decided upon by the encoding entity and thus, may be more or less frequent.

Figure 2:
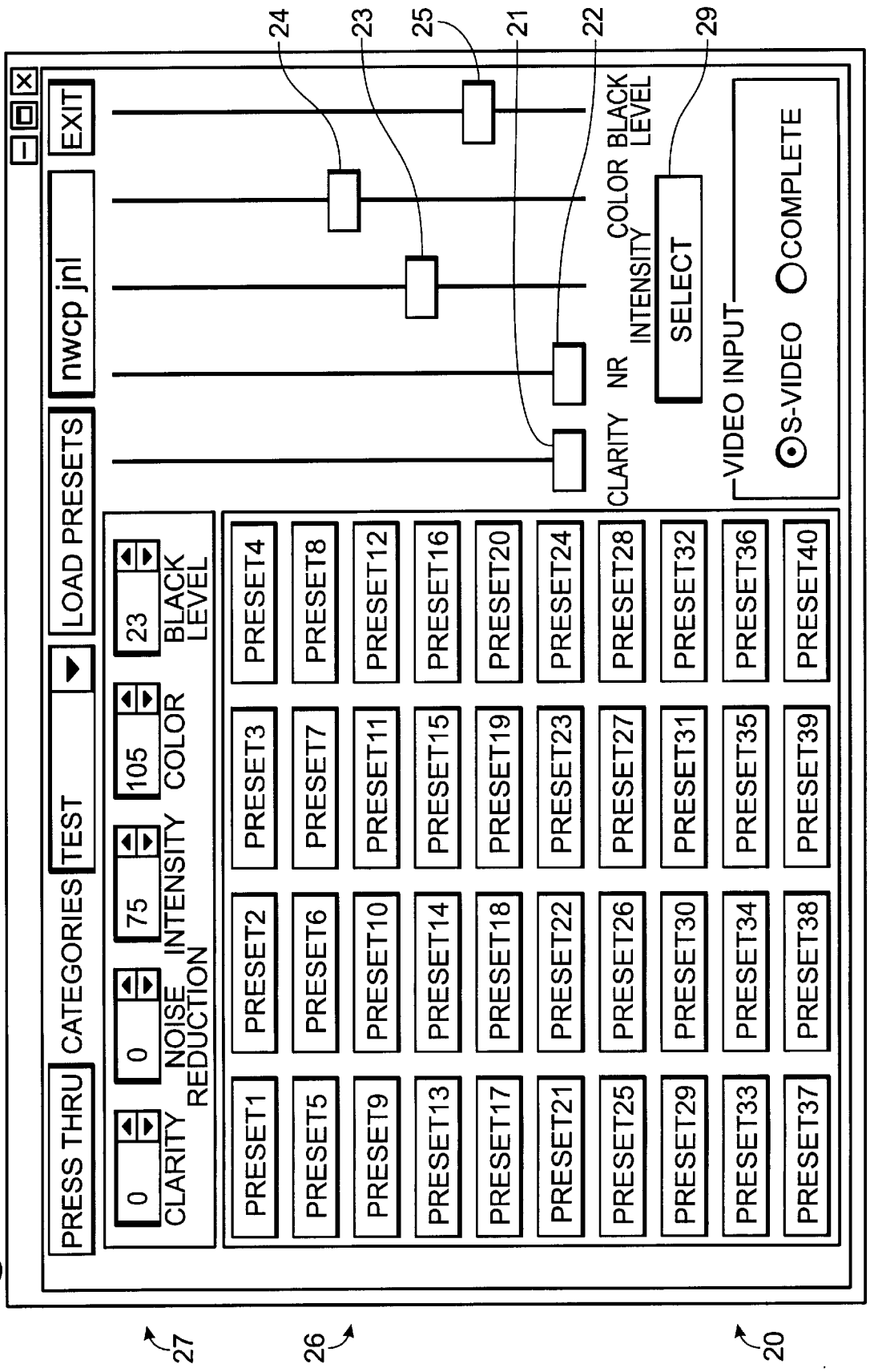
FIG. 2 is a graphical user interface (GUI) for the encoding of picture parameter correction values in accordance with the present invention.

Referring to FIG. 2, a graphical user interface (GUI) for the encoding of picture parameter correction values in accordance with the present invention is shown. While the term "correction" is used as a modifier of the term "value", it should be recognized that what constitutes correction may be subjective and further that values may be selected for some reason other than correction (e.g., artistic effect).

In the illustrated menu, GUI 20 includes control levers 21–25 for clarity, noise reduction, intensity, color and black level, respectively. The GUI also includes a plurality of stored preset designations 26, numerical readouts 27 (which indicate a numerical magnitude for clarity, noise reduction, intensity, color and black level) and other icons related to operation such as video input type and load and exit commands, amongst other features. Parameter setting correction values may be selected by either moving a control lever or changing a numerical readout. A code for a particular combination of picture parameter correction values is preferably stored in each preset. Though only 40 preset designations are shown in FIG. 2, icons to permit "paging-down" to more preset designations may be provided. If an 8-bit word is used to code the correction values, then 256 combinations of these values may be stored (assuming no bits are used for error checking).

As described below, the code for the stored correction values is used to address a look up table (LUT) in processing logic 40. The output of the LUT provides a correction value for up to each of the five picture parameters stated above. While many encoding scenarios are possible, in a preferred embodiment, each of the presets are pre-encoded with a combination of picture parameter correction values. In other word, the LUT in logic 40 contains up to 256 combinations of the five picture parameter correction values. The code utilized (i.e., selected) by the colorist using GUI 20 is the address of the location in the LUT where the desired combination of picture parameter correction values is found. For example, the code associated with present #23 may be 00101101, and this location in the LUT of logic 40 may contain the following correction values CY=20, NR=35, I=55, CR=90 and BL=30.

Figure 3:
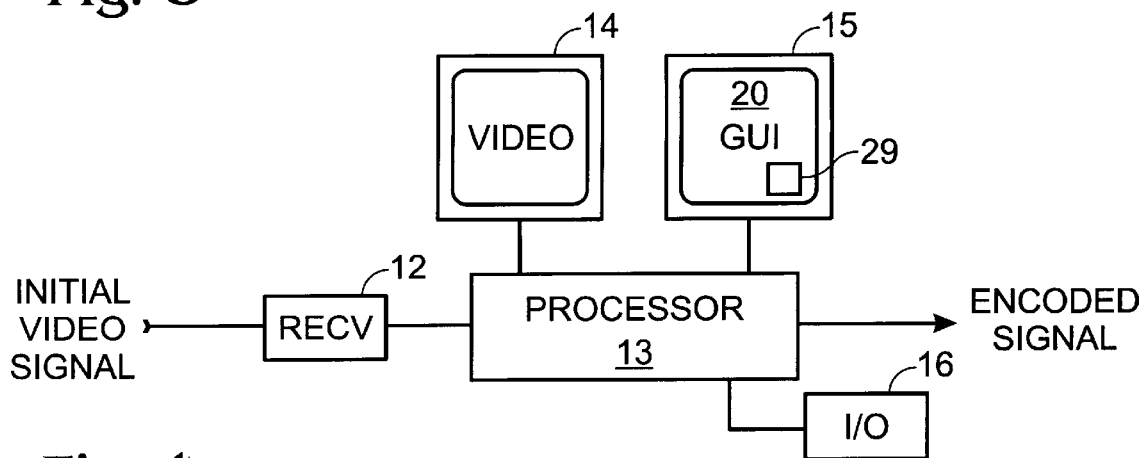
FIG. 3 is a block diagram of componentry that supports the GUI of FIG. 2 and encodes picture parameter information in accordance with the present invention.

Referring to FIG. 3, a block diagram of componentry that supports GUI 20 and encodes picture parameter information is shown in accordance with the present invention. The initial video signal (described below) is input to a video receiver 12 that is coupled to computer 13. The video signal is displayed on monitor 14 while GUI 20 is displayed on monitor 15. Using input device 16, the colorist preferably adjusts each of the picture parameter correction values while looking at the effects thereof on the video picture displayed on monitor 14. Desired levels are determined and the colorist then clicks on a select icon 29 that preferably invokes a best fit algorithm that finds the combination of picture parameter values encoded by a preset that most closely matches or is a "best-fit" for the combination designated by the levers. The appropriate preset is then preferably saved with a designation of the part of the video program with which it corresponds. When all of the scenes have had a preset assigned, the video is re-run and the preset codes are inserted in the vertical blanking interval (VBI) in much the same manner that closed caption and subtitles are encoded. The correction value combinations provided by the address codes or presets may be set by the colorist or other entity to those which are most often desired. If more that 256 correction value combinations are sought, it is possible to use a larger sized word (e.g. 16 bits, 32 bits, etc.). The available codes may point to combinations as described above or may be segregated such that certain bits specify or address certain correction values. For example, if only four picture parameters where utilized (instead of five) and a 16 bit word were provided, then four parameters could each have 16 settings directly selectable by the colorist.

Figure 4:
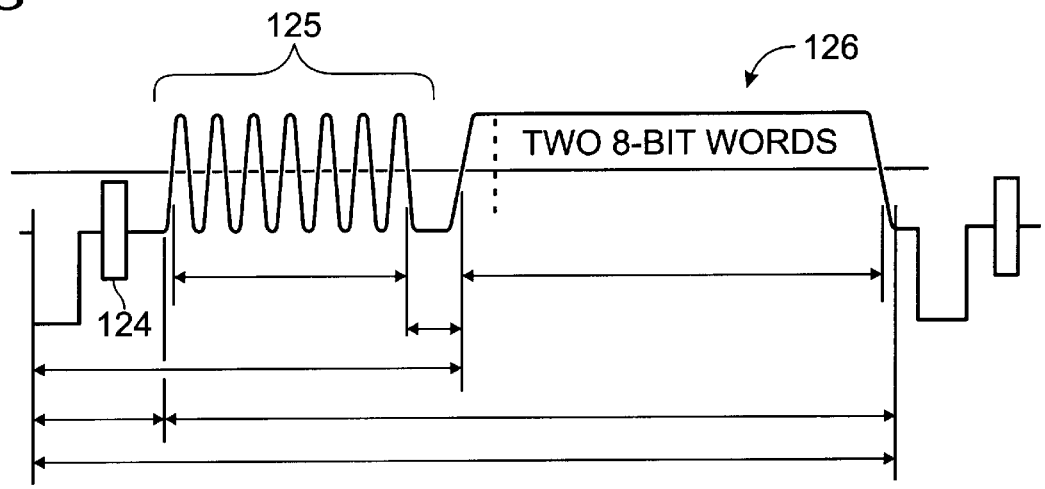
FIG. 4 is a diagram of a line of vertical blanking interval (VBI) signal format in accordance with the present invention.

Referring to FIG. 4, a diagram of a line of vertical blanking interval (VBI) signal format in accordance with the present invention is shown. Currently lines 1–17 of the VBI are reserved by the FCC and line 21 is used for closed captioning. Accordingly, the code selected by the colorist is preferably inserted in lines 19 and/or 20. The data signal format of FIG. 4 includes a program color burst 124, a clock run-in signal 125 and a data region 126 that has sufficient space for at least two 8 bit words. The code for picture parameter correction values may utilize one or more of the 8 bit words in region 126. In an embodiment alluded to above in which more encoding bits are needed, the frequency of the transmission may be increased to create more bits and/or space 126 from another available line in the VBI may be used, etc.

Figure 5:
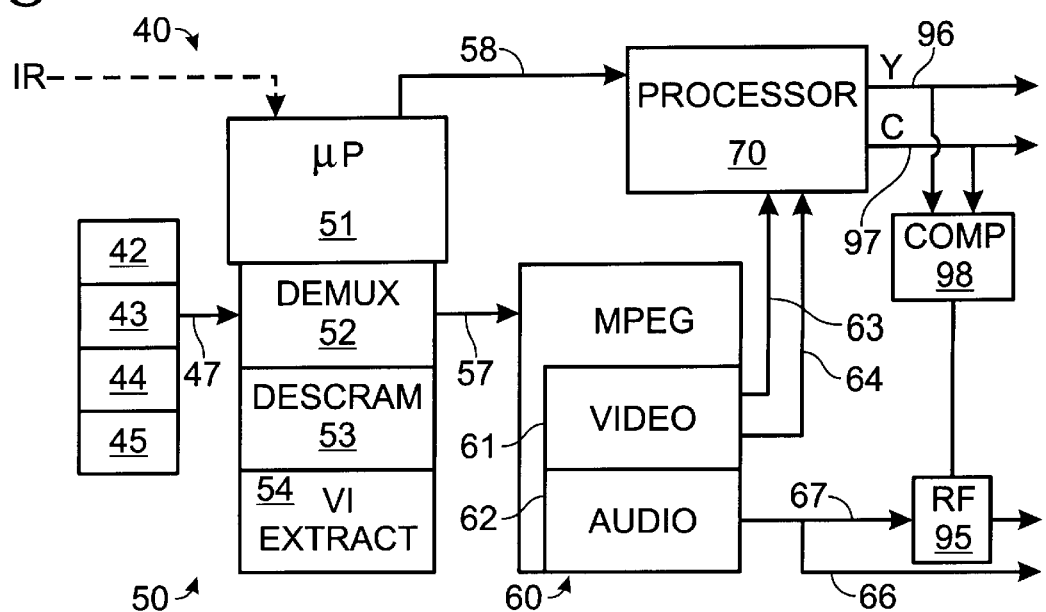
FIG. 5 is a block diagram of the receipt side processing logic in accordance with the present invention.

Referring to FIG. 5, a block diagram of the receipt side processing logic 40 in accordance with the present invention is shown. This logic includes appropriate receivers for DVD, cassette tapes, satellite transmission and terrestrial transmission 42–45, respectively. The output of the appropriate receiver is propagated over line 47 to receive processing block 50.

Receive processing block 50 includes a control processor 51, demultiplexing logic 52, descrambling logic 53 and vertical interval information extracting logic 54. Processor 51 is preferably a microprocessor of a type commercially available from such sources as Intel and Motorola and other sources. Demultiplexing logic 52 represents conventional logic that separates the video and audio components of the input signal and preferably also separates additional audio components (e.g., left and right stereo, SAP, etc.). Descrambling logic 53 represents conventional logic that descrambles the receive video transmission signal to regain the original video signal. Scrambling/descrambling is utilized to provide security to the content of a transmission.

Logic 54 extracts information from the vertical blanking interval such as closed caption, sub-titles, teletex and the picture parameter correction codes or values, and the like. While placement of picture parameter correction values and/or codes therefor within the VBI is new, extracting information from the VBI is not. Thus conventional logic to extract an 8-bit word (or other length code) is preferably utilized to extract the correction value codes. These codes are then propagated over line 58 to a correction value decoding processor 70.

With respect to the video and audio components, the video and audio components of the receive signal are output from block 50 to MPEG processing block 60 over line 57. MPEG block 60 includes conventional logic 61,62 for processing video and audio signals. MPEG refers to an industry standard format that is used in satelite, DVD, STV and HDTV systems, amongst others. While MPEG format is preferred, it should be recognized that other formats may be utilized.

MPEG video logic 61 outputs the luminance (Y) and the chrominance (C) components of the video signal to processor 70 over lines 63 and 64, respectively. The separation of a video signal into luminance and chrominance components is a common method of video signal propagation. MPEG audio logic 62 provides a direct output connection over line 66 and an input to an RF modulation circuit 95 over line 67.

Amongst other conventional processing logic, correction processor 70 includes a look-up-table (LUT) that was introduced above and a correction processing circuit 72. The role of LUT 71 and correction processing circuit 72 are discussed more below with reference to FIGS. 6–7, respectively. In processor 70, the luminance and chrominance signals are processed by signals generated from the correction values and the corrected or otherwise affected Y and C signals are output on lines 96 and 97, respectively. While lines 96 and 97 provide a direct output connection, they are preferably also coupled to a composite circuit 98 that forms a composite signal (suitable for older televisions). The output of composite circuit 98 is preferably propagated to RF modulation circuit 95 where it is output along with the audio signal following conventional techniques.

Figure 6:
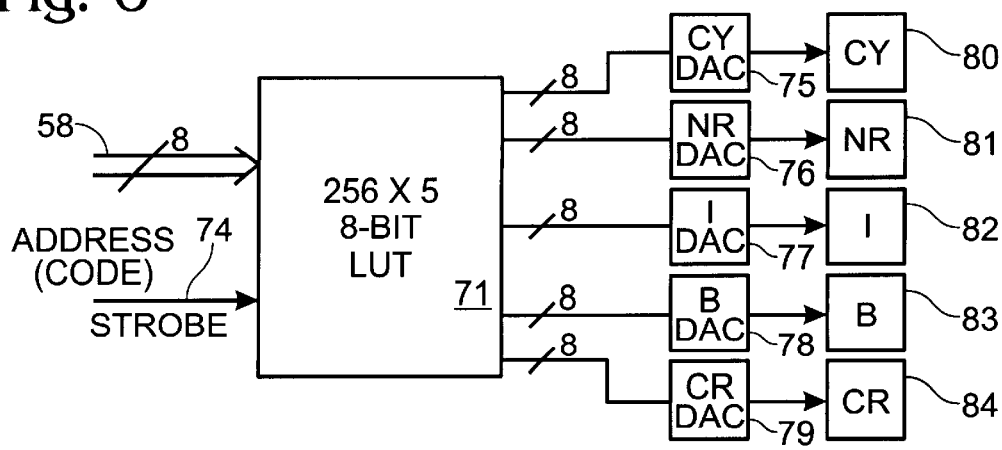
FIG. 6 is a schematic diagram of a LUT in accordance with the present invention.

Referring to FIG. 6, a schematic diagram of a LUT in accordance with the present invention is shown. LUT 71 is preferably a 256×5 byte table that stores five 8 bit correction values for each address location. The 8-bit code stripped off by extraction logic 54 is input to LUT 71 over line 58 and a corresponding strobe signal is input at strobe port 74. Five 8-bit lines are output from LUT 71 and these are each coupled to a digital to analog converter (DAC) 75–79. Each of the 8 bit lines propagates an up to 8 bit value that is converted to an analog control voltage, hence producing CY, NR, I, B and CR analog control signals. The control signals are respectively input to CY, NR, I, B and CR circuits 80–84 that are discussed in more detail below with reference to FIG. 7.

Figure 7:
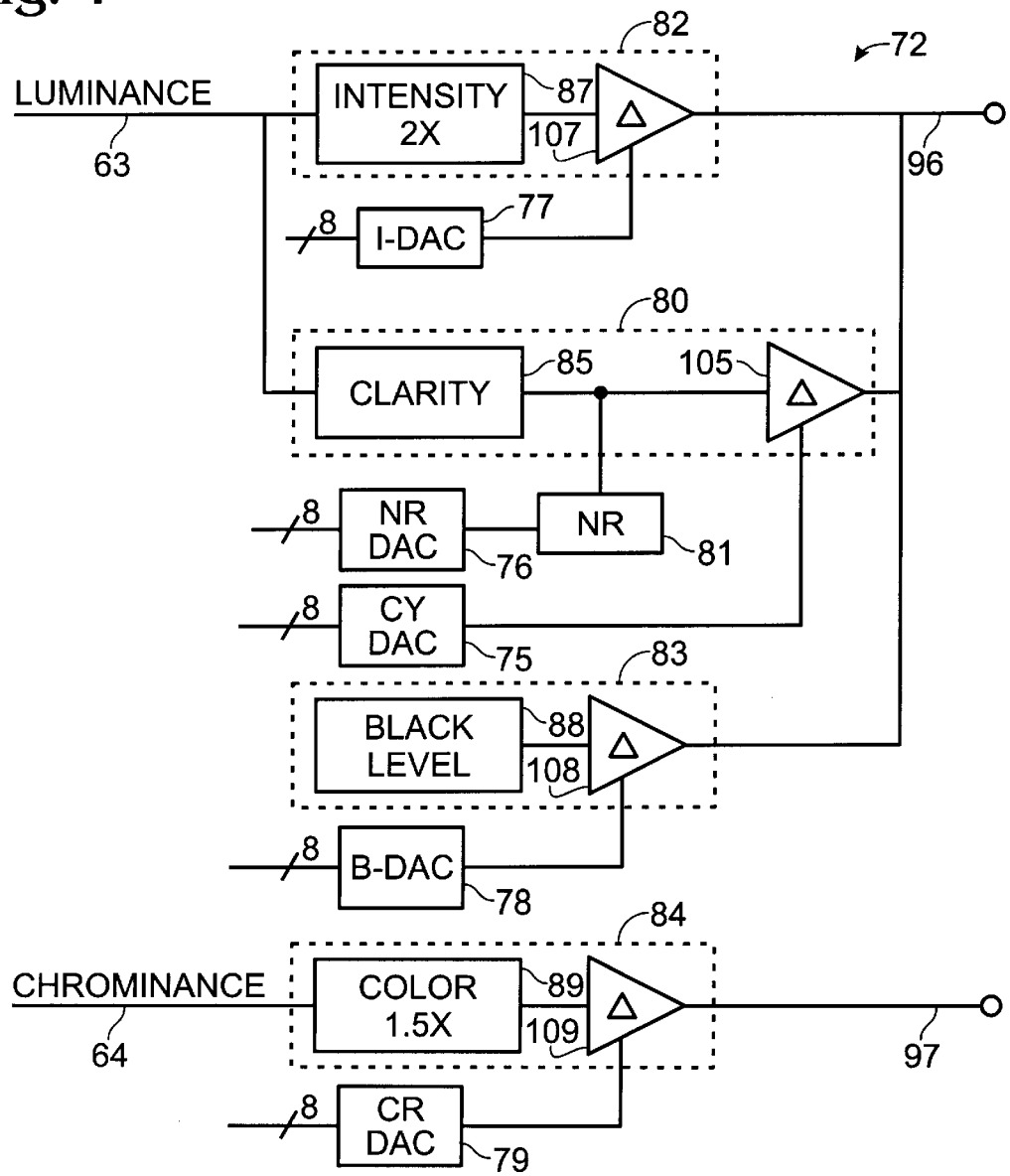
FIG. 7 is a schematic diagram of a correction processing circuit in accordance with the present invention.

Referring to FIG. 7, a schematic diagram of a correction processing circuit in accordance with the present invention is shown. Correction processing circuit 72 receives the luminance and chrominance signals propagated over lines 63 and 64, respectively. The chrominance signal on line 64 is input to a buffer amplifier circuit 88 which amongst other functions preferably amplifies the chrominance signal by one and a half, thereby increasing the range of the chrominance signal. The output of buffer amplifier 88 is input to a voltage controlled amplifier 108 which receives the analog control signal from color DAC 88. The control signal can select between 0 and 100% of the input signal and thus 0 to 150% of the original chrominance signal may be output from circuit 83. The output of buffer amplifier 88 is coupled to line 97 (shown in FIG. 5).

With respect to the luminance signal, this signal is coupled from line 63 to an intensity circuit 82 and a clarity circuit 80. Similar to color circuit 84, intensity circuit 82 includes a buffer amplifier 87. Buffer amplifier 87 preferably increases the luminance signal by a factor of 2 or to 200% of its input value, thereby increasing the dynamic range of the luminance signal. The intensity correction value output from LUT 71 and converted by DAC 77 controls the amount of attenuation (0 to 100%) provided by voltage controlled amplifier 107.

Clarity circuit 80 is directed towards improving the shape of transitions in the luminance signal. Appropriate transition correction techniques are known in the art and include, but are not limited to, those that generate a correction pulse and add that back to the transition to modify same. An appropriate transition correction technique is also disclosed in U.S. patent application Ser. No. 09/040,233, entitled Apparent Clarity Improving Apparatus and Method which is commonly assigned and incorporated herein by reference. In a preferred embodiment, clarity circuit 80 includes circuitry 85 (that may include a buffer amplifier and a differentiator, amongst other components) for generating a correction pulse. The clarity analog control signal preferably controls the amplitude of the correction pulse by providing attenuation from 0 to 100% of the signal from circuitry 85.

The noise reduction control signal is preferably propagated from DAC 76 to a noise reduction circuit 81 that is within the clarity circuit. Noise reduction circuit 81 preferably includes a tunable filter or like device that is capable of modifying the transition correction pulse waveshape in a desired manner, for example, by modifying the width of the correction pulse. The output of DAC 76 may be provided to a voltage controlled resistive device or the like in circuit 81.

Black level circuit 83 produces a black level adjustment signal. Circuit 83 preferably includes a voltage generator 89, and DAC 79 controls the amount to which the output of that voltage generator is attenuated.

The outputs of the intensity, clarity and black level circuits are preferably added to form the improved or otherwise affected luminance signal which is output over line 96.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

What is claimed is:

1. An apparatus for improving or otherwise affecting the picture produced from a video signal, comprising:

a circuit that receives a video signal;

a circuit that extracts from a received video signal a digital picture parameter adjustment code that is representative of at least a first amount by which to adjust a first picture parameter and a second amount by which to adjust a second picture parameter, said first and second picture parameters being from the group of picture parameters including color, noise reduction, intensity, black level and clarity picture parameters;

a circuit coupled to said video signal receiving circuit and said extraction circuit that adjusts the value of the first picture parameter of a received video signal by the first amount and that adjusts the value of the second picture parameter of that received video signal by the second amount; and an output that outputs a received video signal so adjusted;
wherein said first and said second picture parameters are different picture parameters.

2. The apparatus of claim 1, wherein said adjusting circuit includes memory that receives said adjustment code as input and outputs said first amount and said second amount based on the presence of the code at the input of the memory.

3. The apparatus of claim 1, wherein said adjustment circuit includes memory that receives said adjustment code as input and outputs said first amount and said second amount based on the presence of the code at its input.

4. The apparatus of claim 2, wherein said memory includes a look-up table.

5. The apparatus of claim 1, wherein said extraction circuit includes logic that decodes said adjustment code to determine the value of said first amount.

6. The apparatus of claim 1, wherein said adjustment code is provided in the vertical blanking interval of a received video signal.

7. An apparatus for improving or otherwise affecting the picture produced from a video signal, comprising:
a circuit that receives a video signal;
a circuit that extracts from a received video signal a digital picture parameter adjustment code that is representative of at least a first amount by which to adjust a first specific picture parameter from the group of specific picture parameters consisting of color, noise reduction, intensity, black level and clarity picture parameters;
a circuit coupled to said video signal receiving circuit and said extraction circuit that adjusts the value of the first specific picture parameter of a received video signal by the first amount; and
an output that outputs a received video signal so adjusted;
wherein said extraction circuit includes at least one of an attenuator that attenuates a specific picture parameter of a received video signal by an amount represented by the adjustment code and an amplifier that amplifies a specific picture parameter of a received video signal by an amount represented by the adjustment code.

8. A video signal receiving apparatus, comprising:
a video signal receiving circuit;
a code extraction circuit coupled to said receiving circuit that extracts an adjustment code from a received video signal that includes picture parameter adjustment values for at least one of the group of picture parameters including clarity, color, black level, intensity and noise reduction; and
a processing circuit coupled to said receiving circuit that increases a potential magnitude of a component of a received video signal by a value represented by an extracted adjustment code; and
wherein said processing circuit comprises circuitry for modifying picture parameters of a received video signal based on an extracted adjustment code.

9. The apparatus of claim 8, wherein said processing circuit includes a separation circuit that separates a received video signal into a luminance and chrominance component and wherein said processing circuit increases a potential magnitude of at least one of said luminance and chrominance components.

10. The apparatus of claim 9, wherein said processing circuit increases a potential magnitude of both of said luminance and chrominance components.

11. The apparatus of claim 8, wherein said adjustment code is extracted from a vertical blanking interval of a received video signal.

12. A video signal broadcasting apparatus, comprising:
a mechanism that is capable of producing a video output signal that includes video signal programming and an adjustment code therefor, said adjustment code being representative of a first amount by which at least a first specific picture parameter of said video signal programming is to be adjusted, said first specific picture parameter being from the group of specific picture parameters including clarity, color, intensity, black level and noise reduction; and
wherein said adjustment code is also representative of a second amount by which a second picture parameters from the group of specific picture parameters including clarity, color, intensity, black level and noise reduction is to be adjusted.

13. The apparatus of claim 12, wherein said video signal programming and said adjustment code therefor are serially arranged.

14. The apparatus of claim 13, wherein said adjustment code is provided in the vertical blanking interval of a video signal.

15. A method of processing a video signal, comprising the steps of:
receiving a video signal;
extracting from said video signal an adjustment code corresponding thereto that is representative of a first amount and a second amount by which at least a first and a second specific picture parameter of a received video signal are to respectively be adjusted, said first and second specific picture parameter being from the group of picture parameters including color, clarity, intensity, black level and noise reduction;
processing a received video signal based on an extracted adjustment code so as to attenuate the first and second picture parameters of that received video signal.

16. The method of claim 15, further comprising the step of extracting said adjustment code in series with extracting video signal programming from a received video signal.

17. The method of claim 16, further comprising the step of extracting said adjustment code from the vertical blanking interval of a video signal.

18. The method of claim 15, further comprising the step of increasing a potential magnitude of at least one component of a received video signal.

19. An apparatus for improving or otherwise affecting the picture produced from a video signals, comprising:
a video signal receiver;
a circuit that extracts a code component of picture parameter correction information from a received video signal;
a decode circuit having a decode component storage location that utilize said code component to address a corresponding decode component in said storage location; and
a processing circuit that processes a received video signal in accordance with a decode component that corresponds to a code component extracted by said extraction circuit from that received video signal;
wherein said processing circuit further includes at least one attenuation device for attenuating a picture parameter signal of that received video signal.

20. The apparatus of claim 19, wherein one of the decode components in said decode component storage location is used to control said attenuation device.

21. The apparatus of claim 20, wherein said processing circuit includes a separation circuit that separates a received video signal into a luminance and a chrominance signal; and wherein said processing circuit modifies at least one of said luminance and chrominance signals.

22. The apparatus of claim 21, wherein said processing circuit includes a circuit for increasing a potential magnitude of one or more of the luminance and chrominance signals.

23. A video signal receiving apparatus for receiving non-wirelessly transmitted video signal, comprising:

a video signal input configured to receive a video signal transmitted other than by wireless transmission;

an adjustment code extraction circuit coupled to said input that extracts a corresponding adjustment code transmitted with a received video signal; and an adjustment circuit coupled to said input and said extraction circuit that modifies a picture parameter of a received video signal based on an extracted corresponding adjustment code, said picture parameter including at least one of a group of picture parameters comprising color, noise reduction, intensity, black level and clarity picture parameters.

* * * * *